United States Patent [19]
Vernackt

[11] Patent Number: 5,836,581
[45] Date of Patent: Nov. 17, 1998

[54] DEVICE AND METHOD FOR LOADING A SHEET-LIKE MEDIUM

[75] Inventor: Marc Vernackt, Overmere, Belgium

[73] Assignee: Barco Graphics N.V., Ghent, Belgium

[21] Appl. No.: 729,391

[22] Filed: Oct. 11, 1996

[51] Int. Cl.⁶ .................................................. B65H 5/08
[52] U.S. Cl. ............................. 271/11; 271/10.01; 271/5; 271/93
[58] Field of Search ................... 271/10.01, 11, 271/5, 93

[56] References Cited

U.S. PATENT DOCUMENTS

| | | | |
|---|---|---|---|
| 1,910,506 | 5/1933 | Spiess | 271/93 |
| 1,961,401 | 6/1934 | Steinmann | 271/11 |
| 4,106,765 | 8/1978 | Britt et al. | 271/93 |
| 4,380,331 | 4/1983 | Fischer | 271/11 |
| 4,540,167 | 9/1985 | Tamura et al. | 271/11 |
| 4,660,825 | 4/1987 | Umezawa | 271/5 |
| 4,770,404 | 9/1988 | Ueyama et al. | 271/5 |

FOREIGN PATENT DOCUMENTS

| | | | |
|---|---|---|---|
| 0 228 545 | 7/1987 | European Pat. Off. | H04N 1/08 |
| 0 533 145 | 3/1993 | European Pat. Off. | B65H 5/22 |

*Primary Examiner*—William E. Terrell
*Assistant Examiner*—Patrick Mackey
*Attorney, Agent, or Firm*—Dov Rosenfeld

[57] ABSTRACT

The present invention relates to a device and a method for loading a sheet-like medium onto a drum without tension. The drum may be a vacuum drum of an imagesetter for example, or a vacuum drum of an input scanning machine.

In order to load a sheet-like medium onto a drum without any tension, the sheet-like medium is taken over by take-over means before fixing it on the drum.

13 Claims, 6 Drawing Sheets

DEVICE AND METHOD FOR LOADING A SHEET-LIKE MEDIUM

BACKGROUND OF THE INVENTION

1. Field of the Invention

The present invention relates to a device and a method for loading a sheet-like medium without tension onto a drum, and to a device and a method for unloading a sheet-like medium from a drum. The drum may be a vacuum drum of an imagesetter for example, or a vacuum drum of an input scanning machine.

2. Background

In many external drum imagesetters or input image scanners, media to be exposed are loaded onto a vacuum drum by means of suction caps. These suction caps cause bulges in the medium to be exposed, and when the medium to be exposed is taken over by the vacuum of the vacuum drum, these bulges are fixed on the drum. Any pattern that has to be recorded will thus be written on a deformed medium. Once removed from the vacuum drum, the medium takes its original shape without deformation, and the pattern undergoes a deformation which is, though not big, visible and often annoying.

European patent application EP-A2-0 228 545 discloses a film applying and removing device in a drum type image recording scanning apparatus in which the tip end of a film is ascended so as to contact the surface of the drum. Vacuum suction means directly takes the film. This device has a disadvantage: if the film is not perfectly aligned with the drum, it will wrap around the drum at a slant.

Exposed media are often removed from a drum by using suction caps as well. This takes quite a lot of time, as the suction caps need to be moved from the exposed medium wrapped around the drum to an acceptance device such as an unload tray or a developing machine.

European patent EP-0 533 145 discloses an apparatus and a method for removing a sheet from a hollow drum member. The apparatus includes means for supplying a vacuum to the interior of the drum, and two sets of vacuum openings through the surface of the drum member. The sheet is arranged to overlay and close the first set of vacuum openings with the second set of openings extending substantially parallel with an edge of the sheet and comprising only a small portion of the total number of vacuum openings through the drum. An exit blade is disposed adjacent to the drum and has an edge proximate to the drum that extends substantially parallel to the edge of the sheet. The exit blade is disposed with respect to the drum so as to form an acute angle with the surface thereof with the proximate edge of the blade closely adjacent the apex of the angle and parallel with the edge of the sheet so that, when the drum is rotated to a sheet removal position, the first set of vacuum openings lies beneath the acute angle when the edge of the sheet is disposed on the opposite side of the apex.

The method comprises the steps of: rotating the drum to a sheet removal position where the first set of vacuum openings lie beneath the acute angle and the edge of the sheet is disposed on the opposite side of the apex, and drawing air through the second set of vacuum openings by the vacuum in the drum and creating an area of sufficiently high pressure air at the apex to cause air to be forced past the edge of the exit blade with sufficient force to lift the edge of the sheet from the surface of the drum.

This apparatus and method have the disadvantage that means need to be provided for blowing air through the second set of openings in order to remove the sheet from the drum.

OVERVIEW OF THE INVENTION

One aim of the invention is to wrap a sheet-like medium, such as a photosensitive film or a flexible plate, around a drum of a scanning device such as an input scanner or an imagesetter, in a tensionless manner. At the beginning of the load operation, the sheet-like medium rests on or in a material supply device.

According to one embodiment of the present invention, a loading device for loading a sheet-like medium on a drum is provided. This loading device comprises means for supplying a vacuum to the interior of said drum, a material supply device which is able to contain at least one sheet-like medium, and a mechanical device which is able to take a sheet-like medium from the material supply device and move it to the drum. The loading device also comprises take-over means which are able to present the sheet-like medium to the drum without any tension. Preferably these takeover means consist of a lower device and an upper device, whereby the lower device may be for example a take-over plate and the upper device may be a take-over cylinder. The upper device and the lower device are movable relative to each other. There exists a position of the upper and the lower device where the upper device has one point that touches a point of the lower device.

The invention also provides a method for loading a sheet-like medium onto a drum of an apparatus. The apparatus comprises a material supply device, means for supplying a vacuum to the interior of the drum, a mechanical device and take-over means. The method comprises the steps of: taking a sheet-like medium from the material supply device with the help of the mechanical device which is positioned in an initial position, moving the sheet-like medium towards the drum by moving the mechanical device from its initial position to an end position whereby the leading edge of the sheet-like medium is arranged to be taken by the vacuum of the drum, holding the sheet-like medium without tension by means of the take-over means, rotating the drum to a load position, turning a vacuum on in the drum, releasing the sheet-like medium by releasing the take-over means, wrapping the sheet-like medium around the drum and returning the mechanical device to its initial position.

A second aim of the invention is to unload a sheet-like medium from a drum of an apparatus. Thereto an unloading device is foreseen which comprises a transport mechanism, a movable unload table and an upper roll. The upper roll is suitable for being positioned on the drum, while the unload table is appropriate for being moved from an initial position away from the drum to an end position, whereby one edge of the unload table, extending substantially parallel to the width of the drum, is disposed closely adjacent to the drum.

The unloading device may comprise an unload bottom plate, specially prepared so as not to make scratches on the medium. The invention also provides a method for unloading a sheet-like medium from the drum of an apparatus, the sheet-like medium being wrapped around the drum and held around it by means of a high vacuum provided to the interior of the drum. The apparatus comprises an unload table and an upper roll. The initial positions of both means are away from the drum. The end positions of both means are adjacent to the drum. The method comprises the steps of: rotating the drum to an unload position, putting the table and the upper roll down, releasing the high vacuum in the drum, rotating the drum to remove the sheet-like medium, and returning the table and the upper roll to their initial positions.

They present the different stages during the load process of a sheet-like medium.

Figure 1:
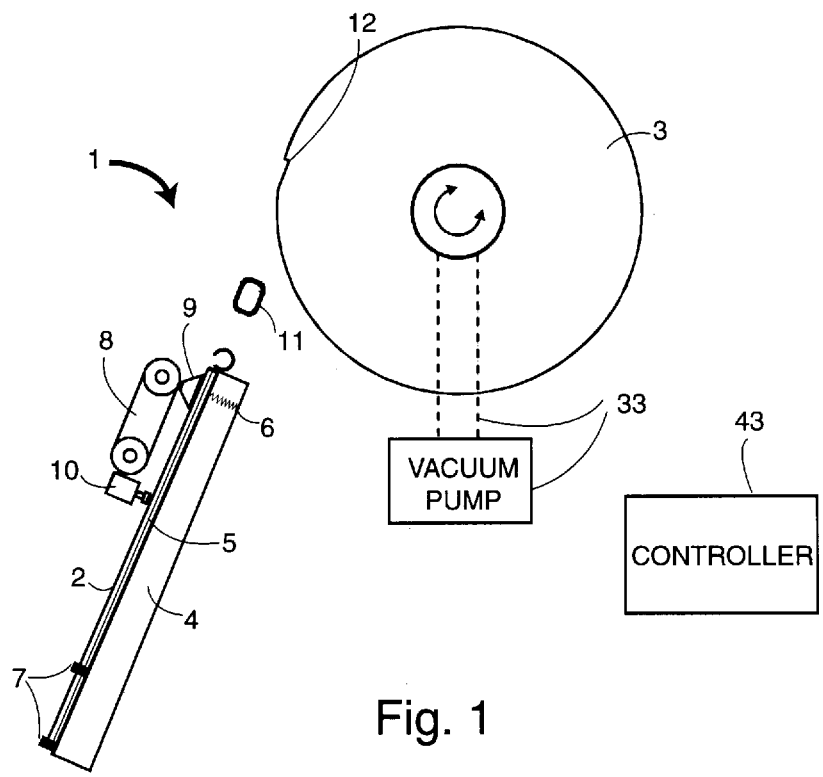
FIGS. 1 through 6 are schematic views showing the main parts of a loading device according to the present invention.

FIG. 1 shows all parts in their initial positions.

Figure 2:
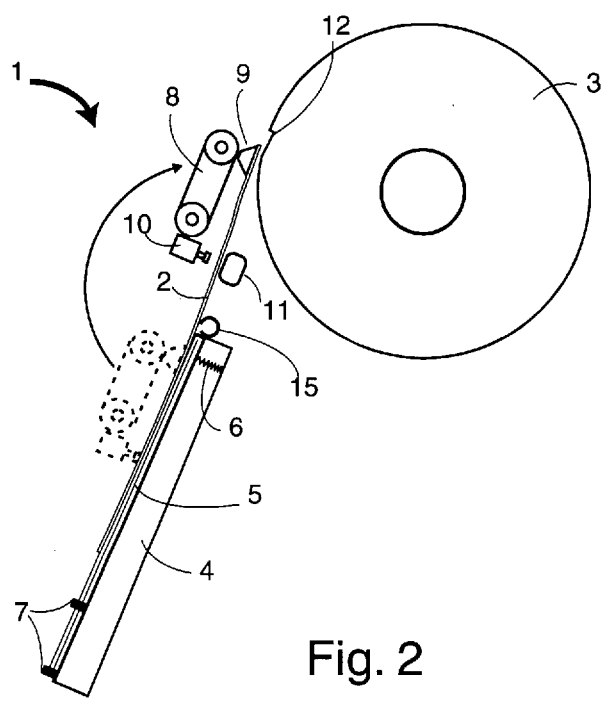

FIG. 2 shows a mechanical device taking a sheet-like medium and moving it to the drum.

Figure 3:
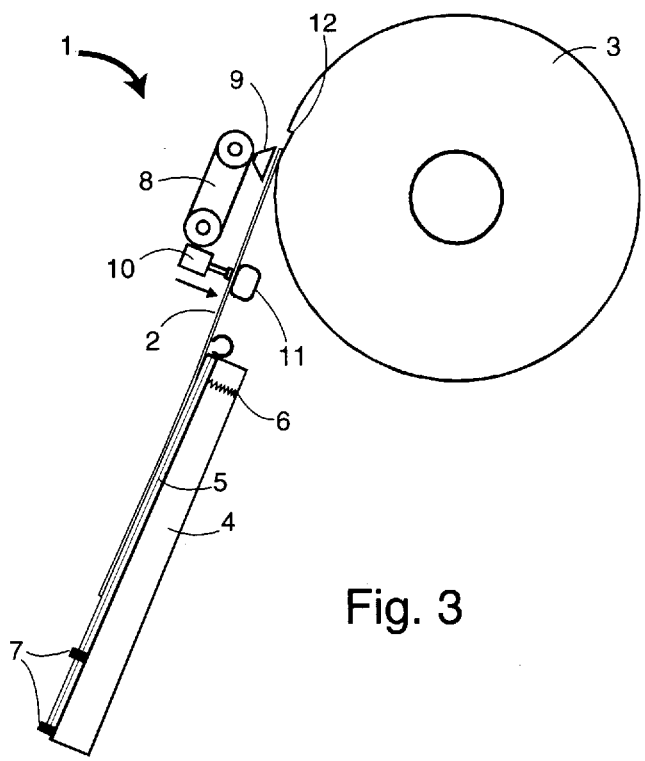

FIG. 3 shows a sheet-like medium being held by the take-over means.

Figure 4:
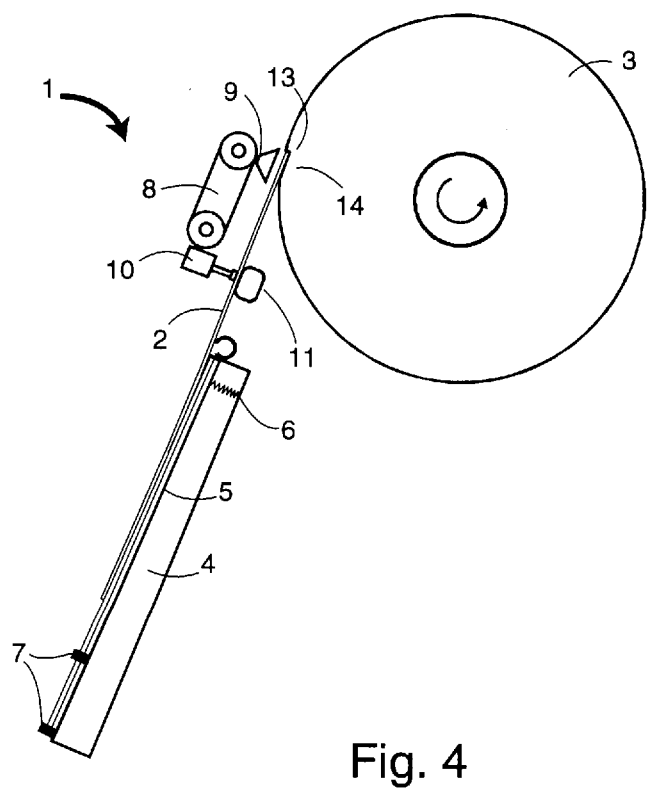

FIG. 4 shows the alignment of the sheet-like medium towards the drum.

Figure 5:
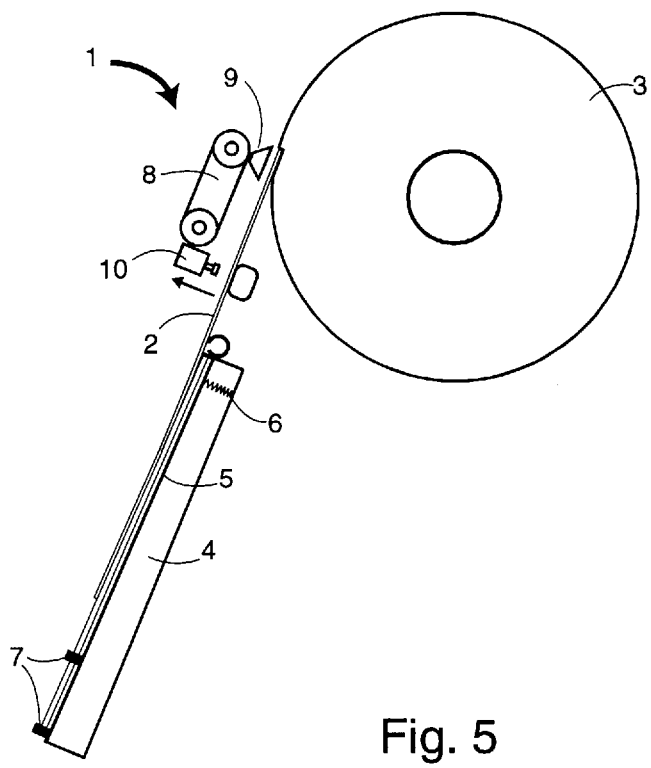

FIG. 5 shows the drum taking over the sheet-like medium and the take-over means releasing it.

Figure 6:
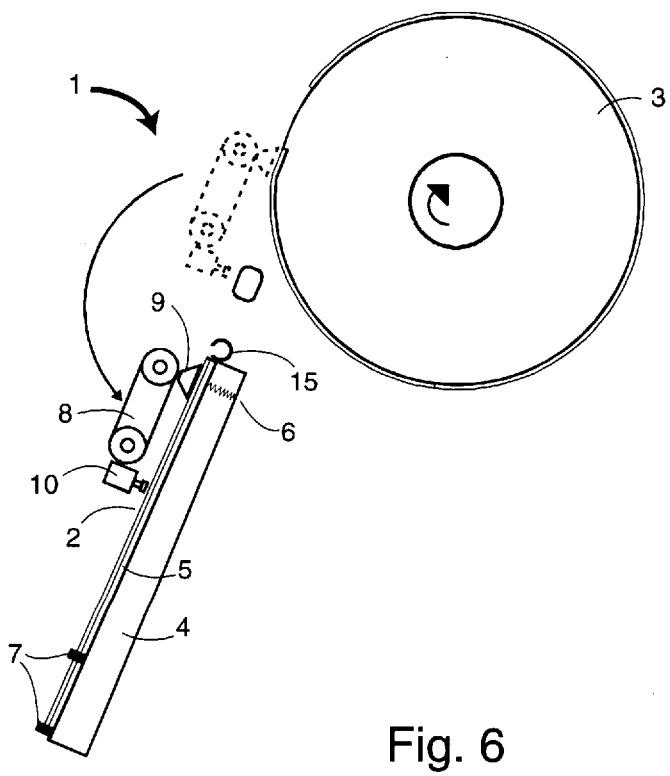

FIG. 6 shows the sheet-like material being wrapped around the drum, and the mechanical device returning to its initial position.

FIGS. 7 through 11 are schematic views showing the main parts of the unload device of an imagesetter. They present the different stages during the unload process of the sheet-like medium.

Figure 7:
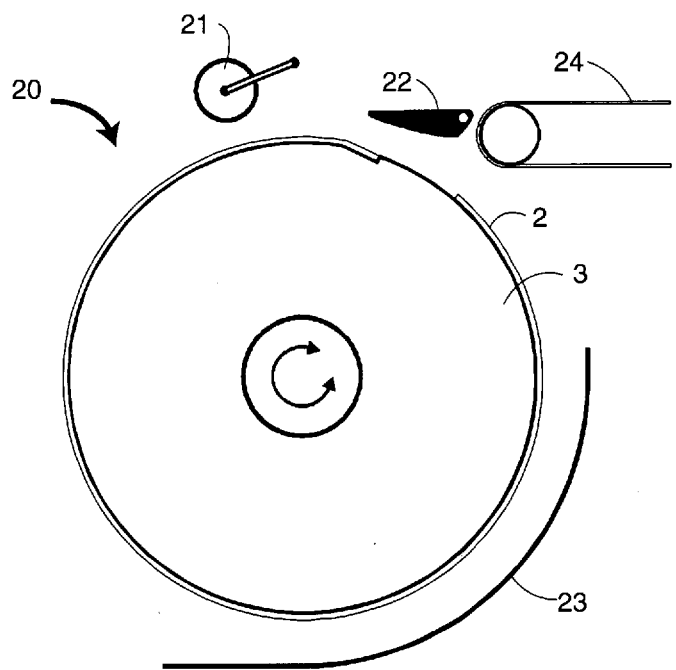

FIG. 7 shows the table and the upper roll in their initial positions, the drum being rotated towards an unload point.

Figure 8:
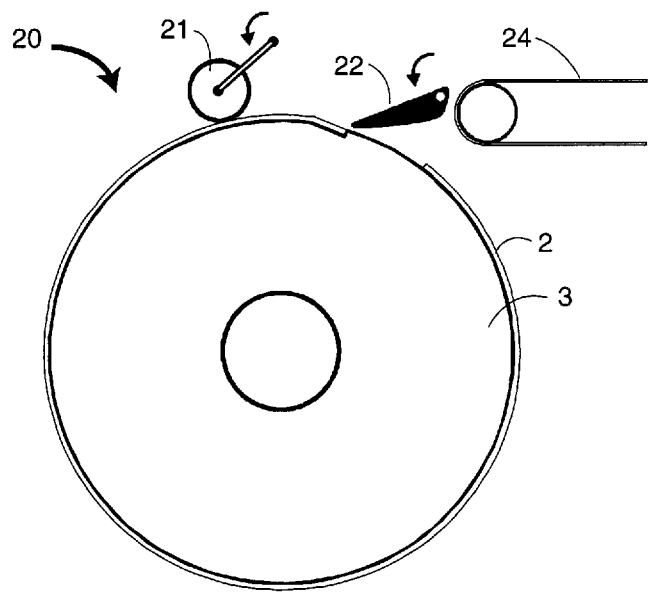

FIG. 8 shows the table and the upper roll put down.

Figure 9:
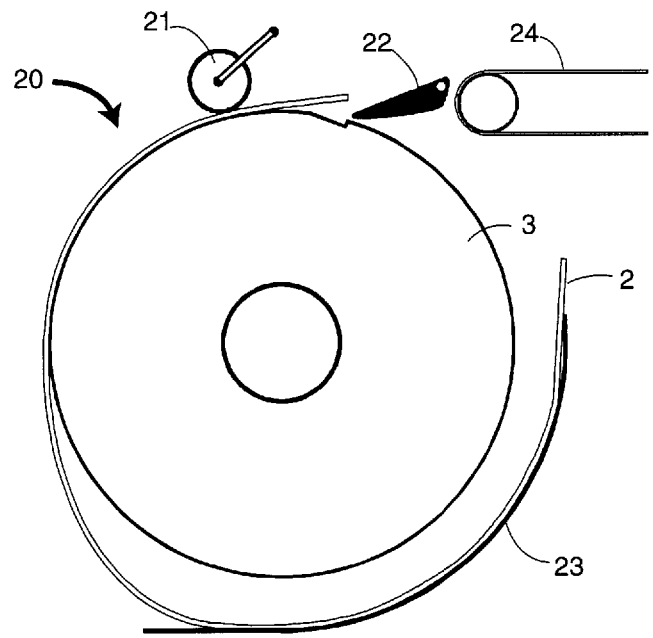

FIG. 9 shows the situation when the vacuum is released.

Figure 10:
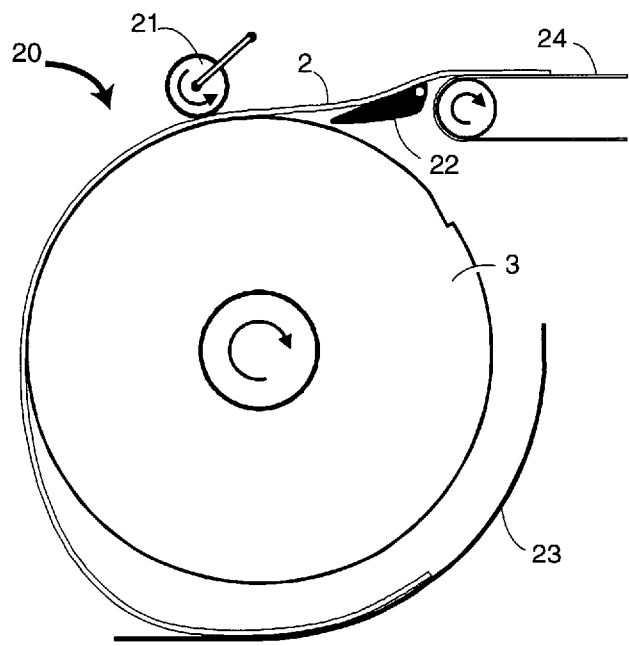

FIG. 10 shows the sheet-like medium being put on the transport mechanism.

Figure 11:
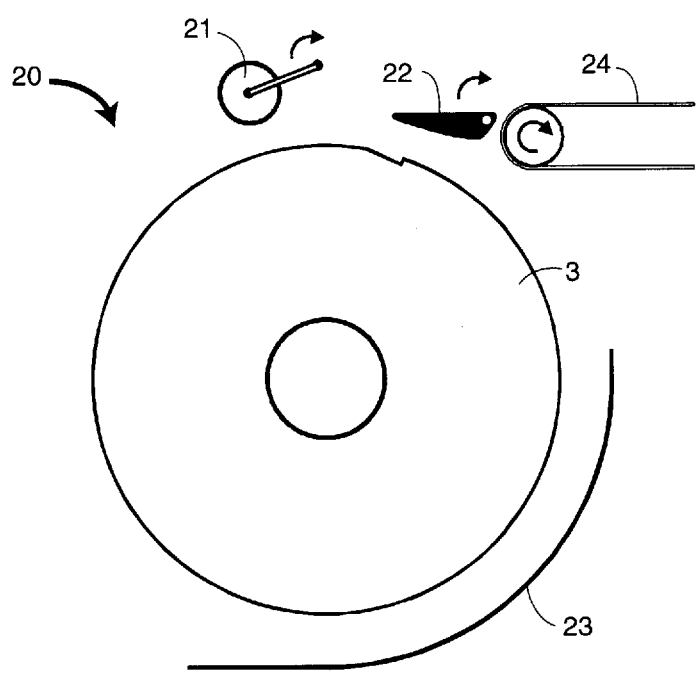

FIG. 11 shows the upper roll and the table returning to their initial positions.

DESCRIPTION OF THE PREFERRED EMBODIMENT

A loading device for a sheet-like medium according to the present invention is illustrated in FIGS. 1 through 6.

In the preferred embodiment described hereinunder, the overall apparatus is a scanning device such as an input scanner or an imagesetter. The sheet-like medium is a film. Other applications are also within the scope of the present invention.

All mechanical movements of the apparatus are governed by a microprocessor 43 (shown only in FIG. 1), the software of which (called hereinafter machine software) commands and controls the movements and handles error messages. How to incorporate such microprocessor control is well known in the art.

FIG. 1 shows a loading device 1 for loading a film 2 on a drum 3. Such a loading device 1 comprises means 33 (shown only in FIG. 1) for supplying a vacuum to the interior of drum 3. These means may be a vacuum pump which is connected to drum 3 in a non-frictional way via a flexible tube. The vacuum is needed because during operation of the apparatus, drum 3 spins at high speed, and should prevent film 2 from falling off drum 3.

Loading device 1 also comprises a material supply device 4 in which one film 2 or a stack of films 2 can be placed. As presented in FIG. 1, material supply device 4 in the preferred embodiment is a load cassette, the depth of the bottom 5 of the cassette changing according to the amount of films 2 that are put in. A spring 6 on the bottom 5 pushes films 2 outwardly towards a fixed point. Due to spring 6, the position of the first film 2, being the only film 2 in the cassette 4 or the film 2 on top of the stack, is always equal, no matter how many films 2 are in load cassette 4. Load cassette 4 can be adapted for use of different sizes of films 2, by means of size adapters 7. No cover is mounted on load cassette 4. This provides very easy access for loading films 2 into load cassette 4.

The initial position of a mechanical device 8, provided with several suction caps 9 and a take-over cylinder 10 (the upper device of the take-over means), is such that suction caps 9 slightly touch first film 2. When a film 2 has to be loaded on drum 3 of the scanning device such as an imagesetter or input scanner, a low vacuum is applied to suction caps 9, and the first film 2 to be exposed is pulled towards mechanical device 8.

If no film is available in or on material supply device 4, no vacuum can be formed. This can be detected in a manner known in the art, and causes the microprocessor to generate and handle an error message.

While taking film 2 to be exposed, drum 3 rotates at a slow speed towards a first load position. Drum 3 is provided with a mechanical stop 12, and the first load position is a position of drum 3 such that, when a film 2 is presented to drum 3, it will not hit mechanical stop 12. The first load position can be changed via a parameter in the software for operating the apparatus. The rotation of drum 3 for reaching the first load position can be clockwise or counter-clockwise, depending on the initial position of drum 3. The software for operating the apparatus detects in which direction the drum should be turned in order to cover the shortest distance.

Mechanical device 8 now moves towards drum 3 (FIG. 2). During this mechanical movement the position of suction caps 9 is kept unchanged. This causes film 2 to be moved towards the drum area.

During the load process, compressed air comes out of an air pipe 15. The air assists film 2 when moving upwards. An air cushion is generated between film 2 to be loaded and the next film remaining in load cassette 4. Changes of sticking films and damaging of the films caused by scratches are thus reduced.

A take-over cylinder 10 is positioned on mechanical device 8 so it will move with mechanical device 8. Take-over cylinder 10 is positioned in the middle of the width of drum 3 and films 2 will always be centered on the width of drum 3 due to size adapters 7. This means that the take-over cylinder is positioned in the middle of the width of film 2.

When mechanical device 8 has finished its movement, take-over cylinder 10 is positioned in front of a take-over plate 11 (the lower device of the take-over means) lying substantially parallel to the surface of drum 3. Take-over cylinder 10 is put down until it slightly hits take-over plate 11 (FIG. 3).

The vacuum in suction caps 9 is turned off. Film 2 is now sandwiched between take-over plate 11 and take-over cylinder 10, and thus cannot fall. This way, film 2 is held in place by only one point, thus eliminating each and any tension in it. As take-over cylinder 10 is positioned in the middle of the width of film 2, film 2 does not move. Take-over plate 11 must be perfectly parallel to drum 3 because the leading edge of film 2 rests on drum 3. If this is not the case, possible deformation can happen during wrapping film 2 around drum 3.

Drum 3 will rotate counter-clockwise towards a second load point. It can be seen on FIG. 4 that a mechanical stop 12 on drum 3, formed by an upstanding surface 13 and a flattened surface 14, is provided. The second load point is the point whereby film 2, the leading edge of which rests on flattened surface 14, just hits upstanding surface 13. The position of drum 3 is again controlled via a parameter in the machine software. The speed of drum 3 for arriving at the right position is very low. This procedure is the alignment of film 2 towards drum 3. Thanks to mechanical stop 12 and because film 2 is held in the middle of it, a perfect alignment of film 2 to drum 3 is possible. This means that problems with possible misalignment of load cassette 4 and/or with films 2 not perfectly placed in load cassette 4 are solved here. A special hole pattern in flattened surface 14 is made to have maximum suction force on film 2.

The high vacuum is now turned on to the interior of drum 3 (FIG. 5). The leading edge of film 2 is fixed on drum 3. Drum 3 spins clockwise one complete turn at a low speed (FIG. 6). As is known in the art, air blows at the back of film 2 during this movement, so no friction-resistance is seen during the turning of drum 3. This results in a low chance of deformation of film 2 during the load process.

Mechanical device 8 now can be returned to its initial position. Mechanical device 8, having been returned to its initial position, is put downwards, so as to slightly touch a new first film 2. Film 2 is wrapped around drum 3 without tension and mechanical device 8 has returned to its initial position. Film 2 is ready to be exposed.

After exposing film 2, it has to be removed from drum 3. Exposed film 2 has to be transported to a developing machine or an unload tray (not shown).

Unloading device 20 and the unloading process are explained in FIGS. 7 through 11.

The first step in the unloading process is the rotation of drum 3 towards an unload point (FIG. 7). This unload point is changeable via a parameter in the software for operating the apparatus. The rotation of drum 3 may be done with a higher speed than the speed during the load process because there is no risk of damaging film 2. It can be clockwise or counter-clockwise, depending on the shortest distance to get drum 3 in the unload position.

Upper roll 21 and table 22 move towards drum 3, one after another or both at the same time (FIG. 8). Upper roll 21 touches film 2 with a low force. The purpose is to get enough friction between upper roll 21 and film 2 without any chance that film 2 deforms. One edge of unload table 22, extending substantially parallel to the width of drum 3, is disposed closely adjacent to drum 3. Unload table 22 does not touch drum 3 but leaves a small space between its edge and film 2. It can be seen from FIG. 8 that the leading edge of film 2 is in front of unload table 22.

When the high vacuum is turned off, it is done rapidly, within 1 second in the preferred embodiment (FIG. 9). This means that the suction force is gone, and film 2 will no longer stick to drum 3. The fact of turning the high vacuum off rapidly gives a kind of shock reaction, which increases the chance that film 2 is released from drum 3.

Because upper roll 21 touches film 2, it is prevented from falling completely. The trailing edge of film 2 can fall, and when it does, it hits unload bottom plate 23 at a certain time.

The leading edge of film 2 will move upwards due to the combination of the stiffness of film 2 and the force exerted on it by upper roll 21. The height of the leading edge of film 2 at this moment has to be higher than that of unload table 22 in order to make it possible to remove film 2 from drum 3. The height of the leading edge of film 2 is a function of the position of upper roll 21 on film 2 (distance from the leading edge) and of the stiffness of film 2. An optimal position may be found for each kind of sheet-like medium.

Because the position of the leading edge of the film 2 is higher than unload table 22, and because upper roll 21 gives a driving power, film 2 will be pushed up table 22 when drum 3 is rotated clockwise (FIG. 10). This happens with a relative high speed.

During this movement, the trailing edge of film 2 is dragged over unload bottom plate 23. Plate 23 preferably is made out of a special material and because of this, no scratches are made on the surface of film 2. At the same time transport mechanism 24, is turned on. As long as film 2 is kept between upper roll 21 and drum 3, the friction force between transport mechanism 24 and the underside of film 2 is lower than the friction force made by upper roll 21. So the speed of the movement of film 2 depends on the spinning speed of drum 3.

From the moment the film 2 is no longer kept between the upper roll 21 and the drum 3, the biggest force will be the friction force of the transport mechanism 24. At that moment the film 2 takes over the speed of the transport mechanism 24.

Thanks to this system, no synchronization is needed between the drum spinning speed and the speed of transport mechanism 24. Transport mechanism 24 brings film 2 towards an unload tray or developing machine.

After disposing film 2 on transport mechanism 24, upper roll 21 and table 22 are returned to their initial positions (FIG. 11).

Transport mechanism 24 stops moving when film 2 is in the unload tray or in the developing machine.

Although this invention has been described with respect to preferred embodiments, those embodiments are illustrative only. No limitation with respect to the preferred embodiments is intended or should be inferred. It will be observed that numerous variations and modifications may be effected without departing from the true spirit and scope of the novel concept of the invention, and it is intended that the scope of the invention be defined by the claims appended hereto.

What is claimed is:

1. A loading device for loading a sheet-like medium on a drum, the loading device comprising:
    a) means for supplying a vacuum to the interior of said drum;
    b) a material supply device able to contain at least one sheet-like medium;
    c) a mechanical device which picks up said sheet-like medium from the material supply device, transports said sheet-like medium to said drum, and releases said sheet-like medium; and
    d) take-over means which engages the sheet-like medium at exactly one point approximately in the center of said sheet-like medium prior to the mechanical device releasing the sheet-like medium, wherein the takeover means allows the sheet-like medium to relax to a substantially tension-free state substantially onto the drum after the mechanical device releases the sheet-like medium; said means for supplying a vacuum supplying a vacuum to the interior of said drum after said take-over means engages the sheet-like medium.

2. The loading device according to claim 1, wherein the take-over means comprises a lower device and an upper device, the sheet-like medium being held at the one point between the lower device and the upper device.

3. The loading device according to claim 2, wherein the lower device is a plate and the upper device is a cylinder, the upper device being located on the mechanical device, so that the upper device is positioned in front of the lower device when the mechanical device has moved a sheet-like medium from the material supply device to the drum, the take-over device taking hold of the sheet-like medium by the cylinder being put down until the cylinder slightly hits the plate.

4. The loading device according to claim 1 wherein the mechanical device includes suction caps.

5. The loading device according to claim 1 wherein the sheet-like medium is film.

6. A method for loading a sheet-like medium onto a drum of an apparatus, the apparatus comprising a material supply device, means for supplying a vacuum to the interior of the drum, a mechanical device, and take-over means, the method comprising the steps of
 a) taking a sheet-like medium from the material supply device using the mechanical device;
 b) after the taking step a), moving the sheet-like medium towards the drum using the mechanical device;
 c) prior to releasing the sheet-like medium from the mechanical device, holding the sheet-like medium at exactly one point approximately in the center of the sheet-like medium by means of the take-over means;
 d) releasing the sheet-like medium from the mechanical device while the sheet-like medium is held by the take-over means at the one point, the sheet-like medium thus relaxing to a substantially tension-free state substantially in contact with the drum;
 e) after the mechanical device releasing step d), turning a vacuum on in the drum while the sheet-like medium is at the substantially tension-free state substantially in contact with the drum; and
 f) after the vacuum turning on step e), releasing the sheet-like medium from the take-over means by releasing the take-over means.

7. The method according to claim 6, further including the step of:
 g) prior to turning the vacuum step (e), rotating the drum to a load position; and
 h) after take-over means releasing step (f), wrapping the sheet-like medium around the drum.

8. The method according to claim 7, further including the step of:
 i) returning the mechanical device to its initial position.

9. The method according to claim 6, wherein the take-over means comprises an upper device and a lower device, the sheet-like medium held by the take over means at the one point between the upper device and the lower device.

10. The method according to claim 6, wherein the sheet-like medium is film.

11. A loading device for loading a sheet-like medium on a drum, the loading device comprising:
 a) means for supplying a vacuum to the interior of said drum;
 b) means for rotating the drum;
 c) a material supply device able to contain at least one sheet-like medium;
 d) a mechanical device able to take a sheet-like medium from the material supply device and move it to the drum;
 e) take-over means which engages the sheet-like medium at exactly one point approximately in the center of said sheet-like medium substantially without tension when no other mechanism holds the sheet-like medium; and
 f) a controller for controlling the sequence of operation of the means for supplying a vacuum, the mechanical device, and the take-over means,
 the controller causing upon command the taking of one sheet-like medium from the material supply device using the mechanical device, then moving the one sheet-like medium towards the drum using the mechanical device, then, prior to releasing the one sheet-like medium from the mechanical device, holding the one sheet-like medium by means of the take-over means, then releasing the one sheet-like medium from the mechanical device while the one sheet-like medium is held by the take-over means, the one sheet-like medium thus relaxing to a substantially tension-free state substantially in contact with the drum, then, after the mechanical device releasing step, turning a vacuum on in the drum while the one sheet-like medium is at the substantially tension-free state substantially in contact with the drum; and after the vacuum turning on step, releasing the one sheet-like medium from the take-over means by releasing the take-over means.

12. The method according to claim 11, wherein the take-over means comprises an upper device and a lower device, the sheet-like medium held by the takeover means at the one point between the upper device and the lower device.

13. The method according to claim 11, wherein the sheet-like medium is film.

* * * * *